(12) United States Patent
Mizukami

(10) Patent No.: US 11,158,080 B2
(45) Date of Patent: Oct. 26, 2021

(54) INFORMATION PROCESSING METHOD, INFORMATION PROCESSING DEVICE, OBJECT DETECTION APPARATUS, AND ROBOT SYSTEM

(71) Applicant: Seiko Epson Corporation, Tokyo (JP)

(72) Inventor: Hiromitsu Mizukami, Matsumoto (JP)

(73) Assignee: Seiko Epson Corporation

( * ) Notice: Subject to any disclaimer, the term of this patent is extended or adjusted under 35 U.S.C. 154(b) by 32 days.

(21) Appl. No.: 16/831,961

(22) Filed: Mar. 27, 2020

(65) Prior Publication Data

US 2020/0311965 A1 Oct. 1, 2020

(30) Foreign Application Priority Data

Mar. 28, 2019 (JP) .............................. JP2019-064127

(51) Int. Cl.
*G06T 7/70* (2017.01)
*G06K 9/00* (2006.01)
*G06K 9/62* (2006.01)
*B25J 9/16* (2006.01)

(52) U.S. Cl.
CPC ................ *G06T 7/70* (2017.01); *B25J 9/163* (2013.01); *B25J 9/1697* (2013.01); *G06K 9/00664* (2013.01); *G06K 9/6262* (2013.01); *G06T 2207/20081* (2013.01); *G06T 2207/30164* (2013.01)

(58) Field of Classification Search
CPC ............. G06T 7/70; G06T 2207/20081; G06T 2207/30164; G06T 2207/10028; G06T 2207/30244; G06T 7/73; G06T 7/50; G06T 17/20; G06T 2200/08; B25J 9/163; B25J 9/1697; B25J 9/1656; B25J 9/1602; G05B 2219/40053; G06K 2209/40; G06K 9/00664; G06K 9/6262; G06K 9/00201; G06K 2209/19
See application file for complete search history.

(56) References Cited

U.S. PATENT DOCUMENTS

2017/0028562 A1\* 2/2017 Yamazaki .............. B25J 9/1697
2018/0211138 A1 7/2018 Yamada et al.
2018/0276501 A1\* 9/2018 Yamada .............. G06K 9/2027
(Continued)

FOREIGN PATENT DOCUMENTS

JP 2018-116599 A 7/2018
JP 2020055096 \* 9/2018 .............. B25J 13/08
(Continued)

*Primary Examiner* — Jerome Grant, II
(74) *Attorney, Agent, or Firm* — Harness, Dickey & Pierce, P.L.C.

(57) ABSTRACT

An information processing method includes: receiving design data of an object; generating object data including shape data of the object and position/posture information of the object from the design data; generating first bulk data by stacking the object data by simulation; extracting the object data disposed on an outermost surface; disposing an imaging section by searching for an imaging angle from which extracted object data is obtained, when the object is imaged by the imaging section; acquiring first imaging data by imaging the object by the imaging section from the imaging angle; and generating learning data by replacing the shape data included in extracted object data with the first imaging data.

5 Claims, 12 Drawing Sheets

(56) References Cited

U.S. PATENT DOCUMENTS

| | | | | |
|---|---|---|---|---|
| 2018/0311824 A1* | 11/2018 | Wada | ........................ | B25J 13/08 |
| 2020/0101613 A1* | 4/2020 | Yamada | .................. | B25J 9/1697 |
| 2020/0310107 A1* | 10/2020 | Kojima | .................. | G02B 26/10 |
| 2020/0311855 A1* | 10/2020 | Tremblay | ................... | G06T 7/70 |
| 2021/0142579 A1* | 5/2021 | Jeong | ........................ | G06T 7/73 |
| 2021/0158562 A1* | 5/2021 | Nakamura | ............ | H04N 5/2253 |
| 2021/0174555 A1* | 6/2021 | Ooba | ....................... | G06T 11/00 |

FOREIGN PATENT DOCUMENTS

| | | | | |
|---|---|---|---|---|
| JP | 2018161692 | * | 10/2018 | ............. B25J 13/08 |
| JP | 2020110920 | * | 7/2020 | ............. B25J 13/08 |

* cited by examiner

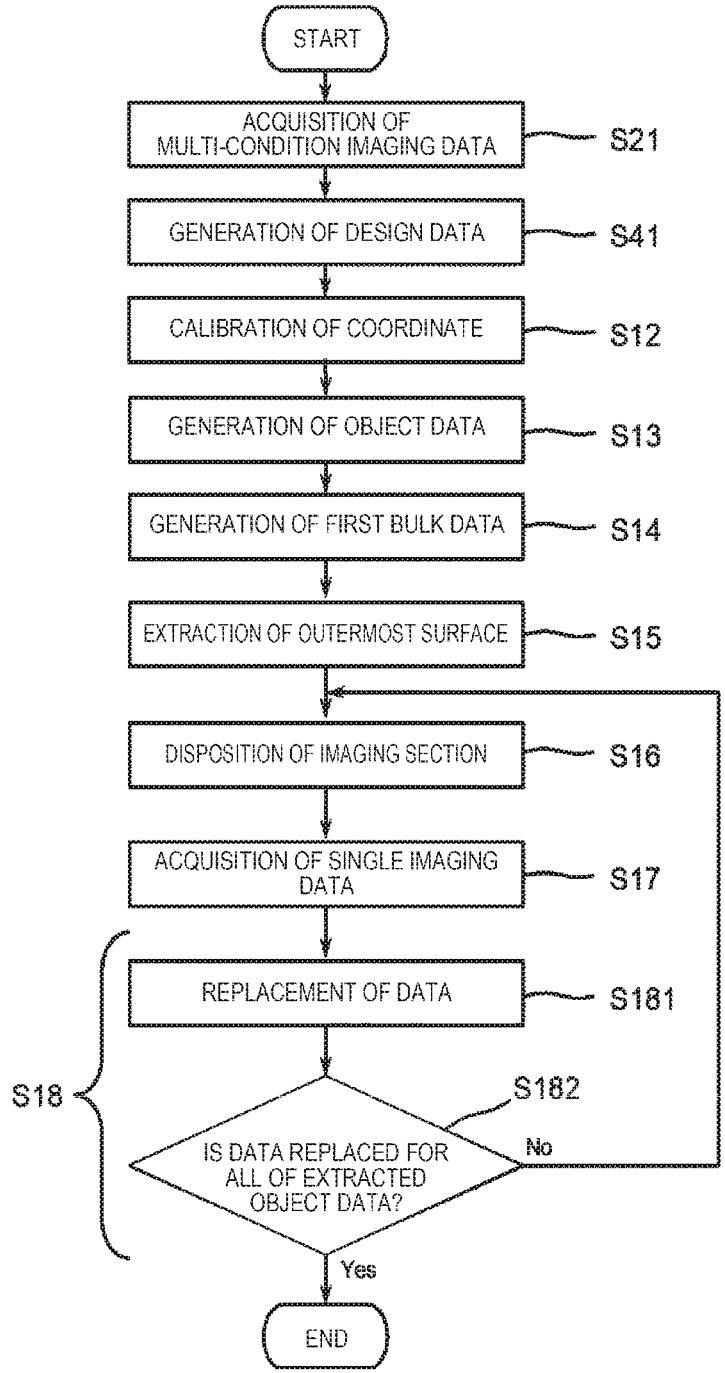

INFORMATION PROCESSING METHOD, INFORMATION PROCESSING DEVICE, OBJECT DETECTION APPARATUS, AND ROBOT SYSTEM

The present application is based on, and claims priority from JP Application Serial Number 2019-064127, filed Mar. 28, 2019, the disclosure of which is hereby incorporated by reference herein in its entirety.

BACKGROUND

1. Technical Field

The present disclosure relates to an information processing method, an information processing device, an object detection apparatus, and a robot system.

2. Related Art

When a robot performs an operation, it is necessary to make the robot recognize a position/posture of a target object such as a workpiece.

For example, in JP-A-2018-116599, an information processing device is disclosed, which includes first acquisition means for acquiring at least one of a position, an orientation, a size, and a type of a target object as learning information necessary for generating learning data related to the target object, determination means for determining an imaging position/posture for imaging the target object based on the acquired learning information, second acquisition means for acquiring an image obtained by imaging the target object at the determined imaging position/posture, and generation means for generating learning data based on the acquired learning information and the imaged image. According to such an information processing device, it is possible to easily generate learning data according to a recognition application of the target object. By generating a model for object recognition using the learning data and recognizing, for example, a center position of the target object based on the model, the center position can be adsorbed to an end effector of the robot.

However, in the information processing device described in JP-A-2018-116599, there is a problem that the learning data for detecting the target object cannot be generated with high accuracy from an image obtained by imaging target objects stacked in bulk when the learning data is generated.

SUMMARY

An information processing method according to an application example of the present disclosure is an information processing method for generating learning data for detecting a position/posture of an object, the method including: receiving design data of the object; generating object data including shape data of the object and position/posture information of the object from the design data; generating first bulk data by stacking the object data by simulation; extracting the object data disposed on an outermost surface as outermost surface object data in the first bulk data; disposing an imaging section based on an imaging angle and an imaging distance at which a position/posture of the outermost surface object data is obtained, when the object placed alone is imaged by the imaging section; acquiring first imaging data by imaging the object placed alone by the imaging section from the imaging angle and the imaging distance; and generating the learning data by replacing the shape data included in the outermost surface object data with the first imaging data, in the first bulk data.

BRIEF DESCRIPTION OF THE DRAWINGS

FIG. 16 is a flowchart illustrating an information processing method according to the fourth embodiment.

DESCRIPTION OF EXEMPLARY EMBODIMENTS

Hereinafter, an information processing method, an information processing device, an object detection apparatus, and a robot system according to the present disclosure will be described in detail based on embodiments illustrated in the accompanying drawings.

1. First Embodiment 1.1 Robot System

First, a robot system according to a first embodiment will be described.

Figure 1:
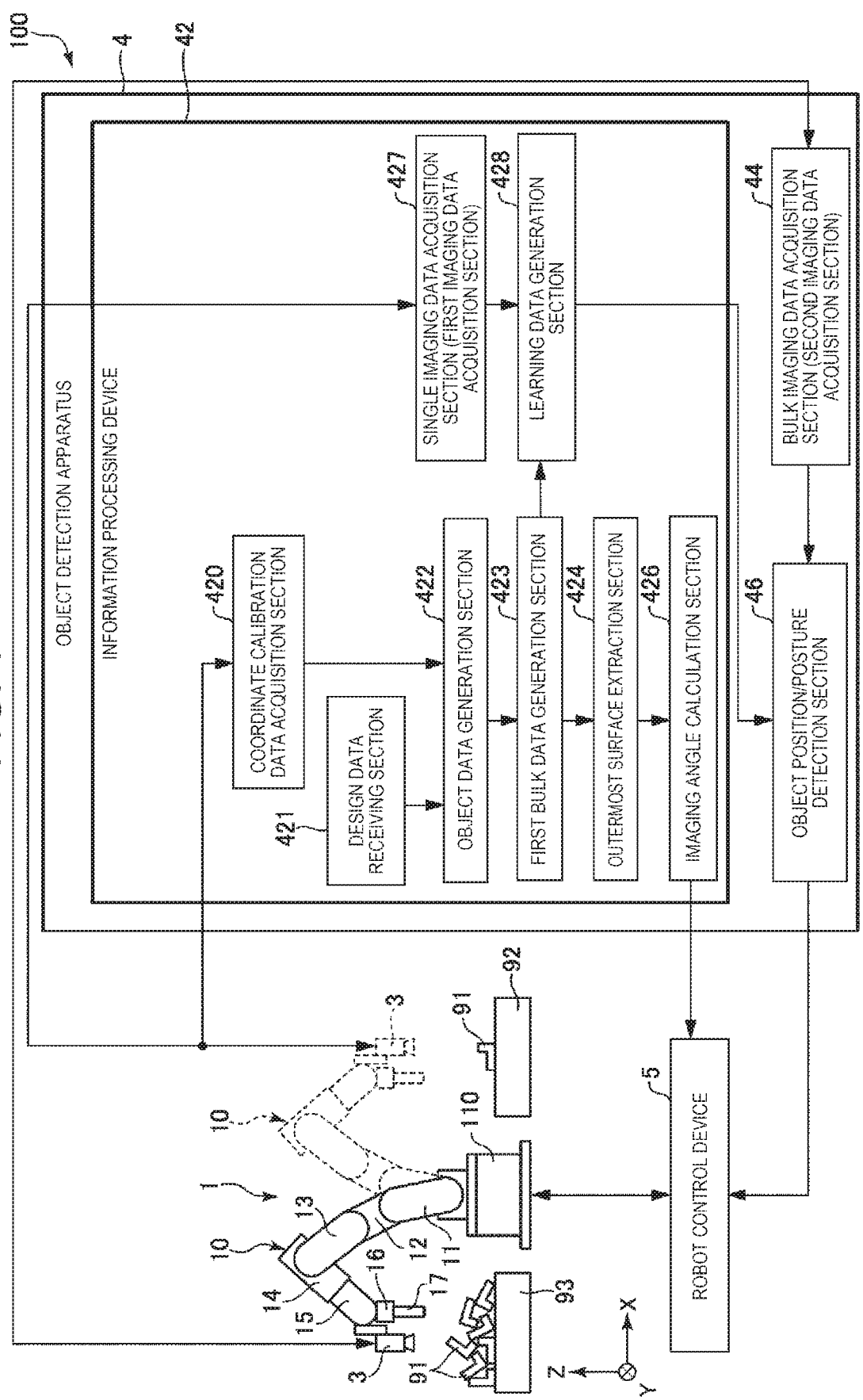
FIG. 1 is a functional block diagram illustrating a robot system according to a first embodiment.

FIG. 1 is a functional block diagram illustrating the robot system according to the first embodiment.

In FIG. 1, an X-axis, a Y-axis, and a Z-axis are illustrated as three axes orthogonal to each other. For convenience of explanation, a distal direction of the Z-axis is "up" and the proximal direction of the Z-axis is "down".

For example, a robot system 100 illustrated in FIG. 1 is used for operations such as holding, transporting, and assembling target objects 91 (objects) such as an electronic component. The robot system 100 includes a robot 1 including a robot arm 10, an imaging section 3 having an imaging function, installed on the robot arm 10, an object detection apparatus 4 detecting the target object 91, and a robot control device 5 controlling driving of the robot 1 based on a detection result of the object detection apparatus 4. Hereinafter, each portion will be described sequentially.

1.1.1 Robot

The robot 1 illustrated in FIG. 1 is a so-called 6-axis vertical articulated robot, and includes a base 110 and a robot arm 10 coupled to the base 110.

The base 110 is a portion for attaching the robot 1 to any installation location. In the present embodiment, the base 110 is installed, for example, at an installation location such as a floor. The installation location of the base 110 is not limited to the floor or the like, and may be, for example, a wall, a ceiling, a movable carriage, or the like. Therefore, the Z-axis in FIG. 1 is not limited to the vertical axis.

The robot arm 10 illustrated in FIG. 1 has a base end coupled to the base 110 and includes an arm 11, an arm 12, an arm 13, an arm 14, an arm 15, and an arm 16. These arms 11 to 16 are connected in this order from a proximal end to a distal end. Each of the arms 11 to 16 is pivotable with respect to an adjacent arm or the base 110.

Although not illustrated, the robot 1 includes a driving device that pivots the arm 11 with respect to the base 110, a driving device that pivots the arm 12 with respect to the arm 11, a driving device that pivots the arm 13 with respect to the arm 12, a driving device for pivoting the arm 14 with respect to the arm 13, a driving device for pivoting the arm 15 with respect to the arm 14, and a driving device for pivoting the arm 16 with respect to the arm 15. Each driving device includes a motor, a controller that controls driving of the motor, and an encoder that detects an amount of rotation of the motor, and is controlled independently by the robot control device 5.

As illustrated in FIG. 1, an end effector 17 capable of adsorbing the target object 91 is mounted on the distal end of the robot arm 10. The end effector 17 includes, for example, a gripping hand, an adsorption hand, a magnetic hand, and the like, and performs various operations while holding the target object 91.

1.1.2 Imaging Section

The imaging section 3 illustrated in FIG. 1 is mounted on the distal end portion of the robot arm 10. The imaging section 3 illustrated in FIG. 1 is configured such that an imaging position is changed by driving the robot arm 10. For example, the imaging section 3 can image the target object 91 placed on a table 92 and the target object 91 placed on a table 93.

The imaging section 3 is communicably coupled to the object detection apparatus 4. The coupling between the imaging section 3 and the object detection apparatus 4 may be wired coupling or wireless coupling.

The imaging section 3 is a device capable of imaging three-dimensional shape data including two-dimensional image data such as a color image, a monochrome image, and an infrared image, and surface point group data such as a depth image, about the target object 91 and surroundings thereof. An example of such an imaging section includes a three-dimensional measurement device that measures a three-dimensional shape of an imaging target by a phase shift method, an active stereo method, or the like.

1.1.3 Object Detection Apparatus

The object detection apparatus 4 is communicably coupled to the imaging section 3 and the robot control device 5. The coupling between the object detection apparatus 4 and the robot control device 5 may be wired coupling or wireless coupling.

Further, the object detection apparatus 4 illustrated in FIG. 1 includes an information processing device 42, a bulk imaging data acquisition section 44, and an object position/posture detection section 46. The object detection apparatus 4 learns a model of the target object by an object recognition algorithm, that is, deep learning in order to hold the target objects 91 stacked in bulk on the table 93 in FIG. 1 by the end effector 17, and detects the individual target objects 91 based on the learning data. The robot control device 5 controls an operation of the robot 1 and causes the end effector 17 to hold the target object 91 based on the detection result.

Hereinafter, each portion of the object detection apparatus 4 will be described.

1.1.3.1 Information Processing Device

The information processing device 42 illustrated in FIG. 1 includes a coordinate calibration data acquisition section 420, a design data receiving section 421, an object data generation section 422, a first bulk data generation section 423, an outermost surface extraction section 424, an imaging angle calculation section 426, a single imaging data acquisition section 427 (first imaging data acquisition section), and a learning data generation section 428.

The coordinate calibration data acquisition section 420 is coupled to the imaging section 3, causes the target object 91 placed alone on the table 92 to be imaged, and acquires the imaging data as coordinate calibration data. As will be described later, the coordinate calibration data causes robot coordinates in a space where the target object 91 is placed to match with simulation coordinates used in simulation described later by associating with the design data received by the design data receiving section 421.

The design data receiving section 421 is coupled to, for example, a data input section (not illustrated) such as a keyboard, a touch panel, a detachable external storage device, and a network, and receives design data of the target object 91 (object) input by a user. The design data is a three-dimensional geometric model of the target object 91. Specifically, the design data may be data of a three-dimensional computer-aided design (CAD) that can be handled by three-dimensional design drawing software, data of three-dimensional computer graphics (CG) which is composed of model components such as points, lines, and surfaces, and can be handled by three-dimensional computer graphics software, or the like.

Of these, the design data is preferably the data of the three-dimensional CAD. Since the data of the three-dimensional CAD is often created when the target object 91 is manufactured, the data is easy to obtain, and since a data capacity is small, the data is easy to be used as the design data.

The object data generation section 422 generates object data including shape data of the target object 91 and position/posture information of the target object 91 from the design data. The shape data of the target object is three-dimensional shape data including two-dimensional image data and surface point group data. Further, the position/posture information of the target object 91 is, for example, position/posture information having six degrees of freedom. Specifically, the position/posture information is configured of position information along the X-axis, position information along the Y-axis, and position information along the Z-axis, posture information about an azimuth angle (Azimuth), posture information about an elevation angle (Elevation), and posture information about a rotation angle (Rotation).

The first bulk data generation section 423 generates first bulk data by stacking a plurality of object data by simulation. Specifically, the position/posture of the target object 91 in the bulk state is simulated by stacking the object data. Although this simulation will be described in detail later, since a large amount of the object data can be handled by calculation, large-scaled learning data can be efficiently generated.

The outermost surface extraction section 424 extracts the object data (outermost surface object data) disposed on the outermost surface in the first bulk data. The outermost surface object data refers to object data in which the Z coordinate indicates a larger value than surroundings in the first bulk data. By extracting the outermost surface object data, for example, it is possible to generate optimal learning data when performing an operation of sequentially holding the target objects 91 in the bulk state from an outermost surface side.

The imaging angle calculation section 426 calculates an imaging angle and an imaging distance corresponding to the extracted outermost surface object data when the imaging section 3 images an image of the target object 91 placed alone on the table 92.

The single imaging data acquisition section 427 (first imaging data acquisition section) uses the imaging section 3 to image the target object 91 that is placed alone on the table 92 at the imaging angle and the imaging distance calculated by the imaging angle calculation section 426. Therefore, single imaging data (first imaging data) is acquired. The single imaging data is actually measured data including two-dimensional image data of the target object 91 and surface point group data of the target object 91.

The learning data generation section 428 replaces the shape data of the target object 91 included in the extracted outermost surface object data with the single imaging data that is the actually measured data, in the first bulk data. Therefore, the learning data including single imaging data that is the actually measured data of the target object 91 and position/posture information of the target object 91 associated therewith is generated.

The configuration of the information processing device 42 according to the first embodiment is described above. An operation of the information processing device 42, that is, an information processing method will be described in detail later.

Figure 2:
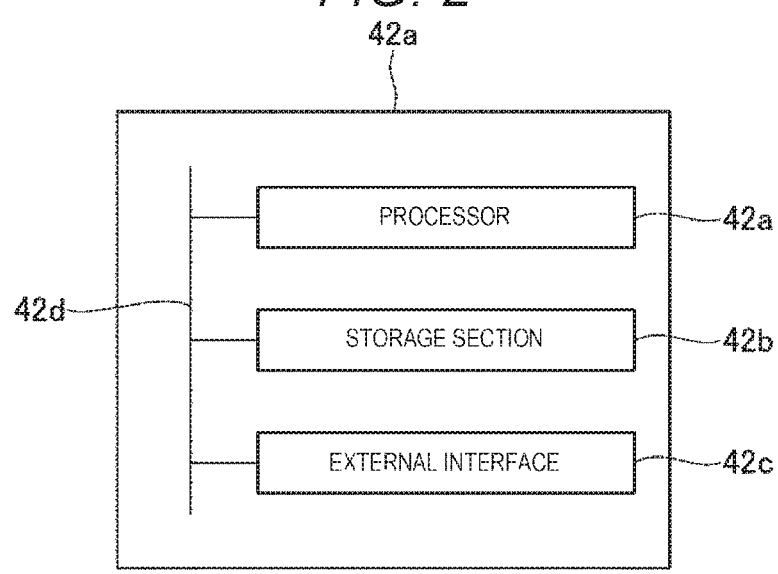
FIG. 2 is a diagram illustrating an example of a hardware configuration of an information processing device illustrated in FIG. 1.

FIG. 2 is a diagram illustrating an example of a hardware configuration of the information processing device 42 illustrated in FIG. 1.

The information processing device 42 illustrated in FIG. 2 includes a processor 42*a*, a storage section 42*b*, and an external interface 42*c*. These elements are communicably coupled to each other via a system bus 42*d*.

The processor 42*a* includes a central processing unit (CPU) and the like. Various programs and the like stored in the storage section 42*b* are read and executed. Therefore, various calculations and various processes in the information processing device 42 are realized.

The storage section 42*b* stores various programs and the like that can be executed by the processor 42*a*. Examples of the storage section 42*b* include a volatile memory such as a random access memory (RAM), a nonvolatile memory such as a read only memory (ROM), and a detachable external storage device. In addition to the programs, the storage section 42*b* stores data, setting values, and the like output from each section described above.

Examples of the external interface 42*c* include a wired local area network (LAN), a wireless LAN, and the like.

A function of each section of the information processing device 42 is realized by the processor 42*a* executing a program, but at least a part thereof may be realized by hardware.

Further, the information processing device 42 may be disposed within a housing of the robot 1, may be disposed outside the housing, or may be provided in a remote place via a network or the like.

1.1.3.2 Bulk Imaging Data Acquisition Section

The bulk imaging data acquisition section 44 (second imaging data acquisition section) causes the imaging section 3 to image the target objects 91 stacked in bulk on the table 93 and acquires bulk imaging data (second imaging data). In addition, the bulk imaging data acquisition section 44 outputs a control signal to the robot control device 5 so that the imaging section 3 is disposed at a position where the bulky target object 91 can be imaged.

1.1.3.3 Object Position/Posture Detection Section

The object position/posture detection section 46 detects the position/posture of the target objects 91 stacked in bulk on the table 93 based on the stacked imaging data and the learning data. Therefore, even in a state of being stacked in bulk, individual objects 91 can be detected and an operation such as holding by the end effector 17 can be performed.

1.1.4 Robot Control Device

The robot control device 5 has a function of controlling the operation of the robot 1 and is communicably coupled to the robot 1 and the object detection apparatus 4 as illustrated in FIG. 1. The robot control device 5, the robot 1, and the object detection apparatus 4 may be coupled by wire or may be coupled wirelessly. The robot control device 5 may be coupled to a display device such as a monitor, an input device such as a keyboard and a touch panel, and the like.

Although not illustrated, the robot control device 5 includes a processor, a storage section, and an external interface, and these components are communicably coupled to each other via various buses.

The processor includes a processor such as a central processing unit (CPU) and executes various programs stored in the storage section. Therefore, control of driving of the robot 1 and processes such as various calculations and determinations can be realized.

1.2 Information Processing Method

Figure 3:
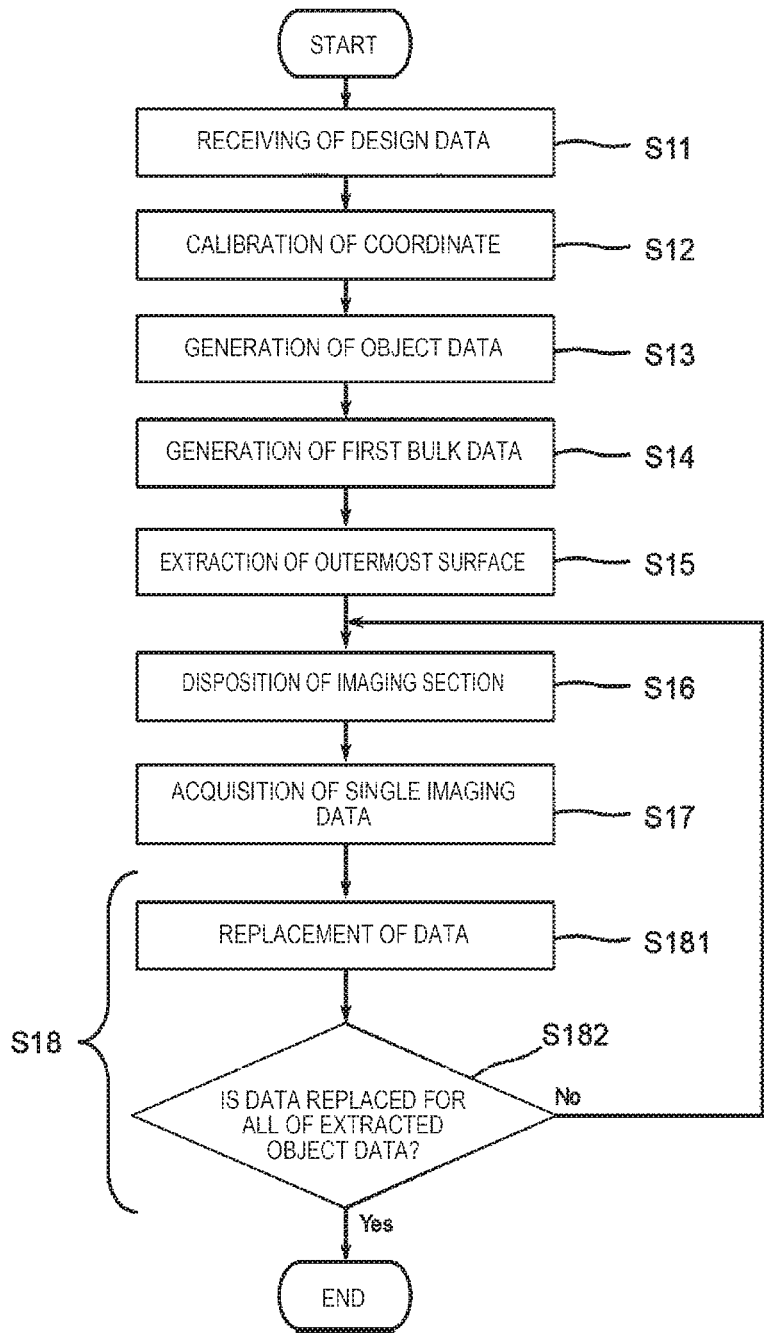
FIG. 3 is a flowchart illustrating an information processing method according to the first embodiment.

Next, an information processing method according to the first embodiment will be described. FIG. 3 is a flowchart illustrating the information processing method according to the first embodiment.

The information processing method illustrated in FIG. 3 is a method for learning the model of the target object 91 by using the design data of the target object 91 and efficiently generating the learning data. In the information processing method illustrated in FIG. 3, a large amount of learning data can be efficiently generated, and a load required for generating the learning data can be reduced.

The information processing method illustrated in FIG. 3 includes step S11 of receiving the design data, step S12 of correcting coordinates, step S13 of generating the object data, step S14 of generating the first bulk data by stacking the object data, step S15 of extracting the outermost surface of the first bulk data, step S16 of calculating the imaging angle and the imaging distance of the imaging section 3 based on the extracted outermost surface object data and disposing the imaging section 3 so as to be the imaging angle and the imaging distance, step S17 of acquiring the single imaging data (first imaging data) by the imaging section 3, and step S18 of generating the learning data based on the object data and the single imaging data. Hereinafter, each step will be sequentially described.

1.2.1 Receiving of Design Data (Step S11)

First, the design data receiving section 421 receives the design data of the target object 91. The receiving of the design data is performed by inputting the design data to a data input section (not illustrated). As described above, the design data is, for example, the data of the three-dimensional CAD, the data of the three-dimensional CG, or the like.

1.2.2 Calibration of Coordinate (Step S12)

Next, the robot coordinates in the space where the target object 91 is placed are matched with the simulation coordinates used in the simulation performed in step S14 described later. That is, the coordinate calibration is performed.

Specifically, the target object 91 is placed alone on the table 92. At this time, the user preferably places the target object 91 in a pose (stable pose) which is stable when the target object 91 is placed on a plane.

Next, the imaging section 3 is disposed at a predetermined position, and images the target object 91 placed on the table 92. Therefore, the coordinate calibration data acquisition section 420 acquires the imaging data serving as the coordinate calibration data. The coordinate calibration data is, for example, three-dimensional shape data including two-dimensional image data and surface point group data, but the two-dimensional image data may be omitted.

Next, the surface point group data is extracted from the design data. The surface point group data included in the coordinate calibration data is associated with the surface point group data extracted from the design data. For this association, for example, an iterative closest point (ICP) method is used. Therefore, unique position/posture information included in the design data can be assigned to the coordinate calibration data in which the target object 91 placed in a stable pose is imaged. In this manner, the coordinate calibration is performed and registration of a reference posture is completed. The reference posture is a reference for calculating the imaging angle and the imaging distance when the imaging angle and the imaging distance of the imaging section 3 are calculated in step S16 described later.

Further, when the target object 91 has a plurality of stable poses, each stable pose is registered as the reference posture. When the reference posture is registered in this way, there may be a range on a space where the target object 91 cannot be imaged. Therefore, the range is obtained in advance by the following procedure.

Figure 4:
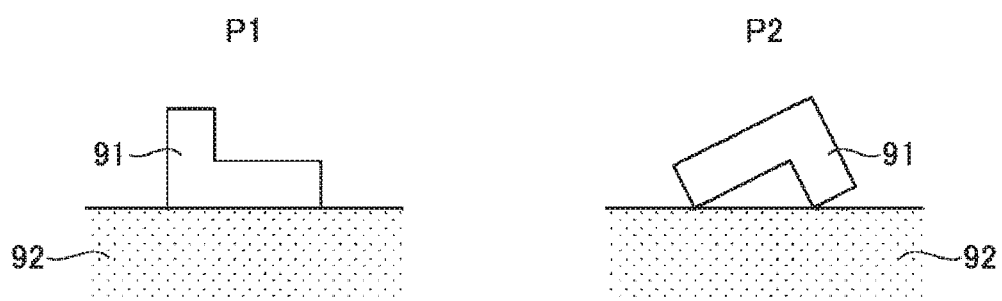
FIG. 4 is a conceptual view illustrating an example of a range in which a target object cannot be imaged.

FIG. 4 is a conceptual view illustrating an example of a range in which the target object 91 cannot be imaged.

In the example illustrated in FIG. 4, it is assumed that the target object 91 has two stable poses. As illustrated in FIG. 4, when the target object 91 is placed on the table 92 in two poses of a stable pose P1 and a stable pose P2, the range on the space that can be imaged by the imaging section 3 is a range on the table 92. In FIG. 4, dots are added in a range where the imaging section 3 cannot image an image, that is, below the upper surface of the table 92.

Figure 5:
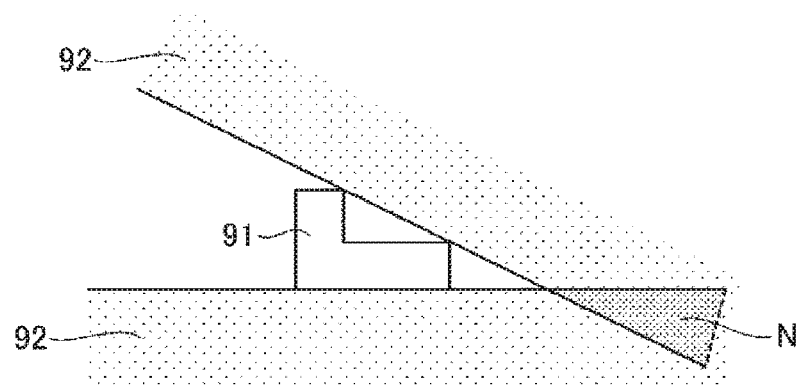
FIG. 5 is a view in which ranges that cannot be imaged by an imaging section are synthesized based on the target object, when the target object is placed on a table in two stable poses illustrated in FIG. 4.

FIG. 5 is a view in which the ranges that cannot be imaged by the imaging section 3 when the target object 91 is placed on the table 92 in the two stable poses P1 and P2 illustrated in FIG. 4 are synthesized based on the target object 91. As a result of the synthesis, in FIG. 5, most of the range that cannot be imaged by the imaging section 3 between the stable poses P1 and P2 can be complemented with each other. But there is a partial range N that cannot be imaged by the imaging section 3. The range N is an overlapping portion of the regions marked with dots in FIG. 4. When such a range N exists, the imaging angle and the imaging distance of the imaging section 3 are limited in the registered reference posture. That is, even if the imaging section 3 is disposed in the range N, the imaging data cannot be acquired, and thus a limitation is imposed in advance.

When the number of stable poses is large, the range N can be sufficiently narrowed by increasing the number of reference postures to be registered.

Further, when the calibration of coordinates is completed and calibration is not necessary, the present step can be omitted.

1.2.3 Generation of Object Data (Step S13)

Next, the object data generation section 422 generates the object data from the design data. As described above, the object data is data including the shape data of the target object 91 and the position/posture information of the target object 91. When the design data is, for example, three-dimensional CAD data, the shape data of the target object 91 including the two-dimensional image data of the model and the surface point group data can be generated by data conversion. Further, since the three-dimensional CAD data has the position/posture information of the target object 91, the data can be assigned to the object data.

1.2.4 Generation of First Bulk Data (Step S14)

Next, in the first bulk data generation section 423, the first bulk data is generated by stacking a plurality of object data by simulation. The first bulk data is synthesized object data obtained by stacking and synthesizing the plurality of object data. In the simulation, first, conditions such as sizes of boxes to be stacked in bulk, the number of target objects 91 to be stacked in bulk, and the position of the imaging section 3 in the first bulk data are input as initial conditions about bulk. The input may be performed by using a data input section (not illustrated) coupled to the first bulk data generation section 423. Next, the three-dimensional posture of the target object 91 when the target object 91 is dropped alone is simulated. Therefore, a large number of each object data in the first bulk data can be generated. Such a simulation can be performed by using, for example, a physical calculation library for the target object 91.

Further, it is preferable that among the object data stacked by simulation, the object data, which is obtained in step S12 described above and in which the imaging section 3 is located in a range where the target object 91 cannot be imaged, is deleted.

1.2.5 Extraction of Outermost Surface (Step S15)

Next, the outermost surface extraction section 424 extracts the object data (outermost surface object data) located on the outermost surface, in the first bulk data. The object data located on the outermost surface is object data representing a value in which, for example, the Z coordinate is larger than the surroundings, in the first bulk data. In the first bulk data obtained by simulation, the position/posture of each object data is known, so that it is easy to extract the object data located on the outermost surface. The object data located on the outermost surface is not necessarily limited to object data disposed in the position/posture such that the entire outer shape of the target object 91 can be imaged by the imaging section 3, and may include object data disposed in such a position/posture at which some portions which cannot be imaged exist.

Such extraction of the object data is performed for all object data located on the outermost surface in the first bulk data.

1.2.6 Disposition of Imaging Section (Step S16)

Next, the imaging angle calculation section 426 calculates the imaging angle and the imaging distance of the imaging section 3 corresponding to the object data located on the outermost surface.

Specifically, first, when the target object 91 placed alone on the table 92 is imaged by the imaging section 3, the position/posture information included in the object data located on the outermost surface extracted in step S15 is specified. In the simulation, the imaging angle and the imaging distance at which the target object 91 can be imaged with the same position/posture as the specified position/posture information are calculated. That is, the imaging angle and the imaging distance, which are imaged in a same way as the image data and the surface point group data of the target object 91 synthesized from the design data, are calculated. In the calculation, a relationship between the reference posture registered in step S12, and the imaging angle and the imaging distance of the imaging section 3 when obtaining the reference posture can be used.

Subsequently, a control signal is output from the imaging angle calculation section 426 to the robot control device 5 so that the imaging angle and the imaging distance calculated by the imaging section 3 are obtained. The robot arm 10 is driven to change the disposition of the imaging section 3. If there is no need to change the disposition, the disposition of the imaging section 3 may be left as it is.

1.2.7 Acquisition of Single Imaging Data (Step S17)

Next, based on the control signal from the single imaging data acquisition section 427 (first imaging data acquisition section), the imaging section 3 images the target object 91 placed alone on the table 92. The single imaging data acquisition section 427 acquires the single imaging data (first imaging data). The single imaging data is actually measured data including two-dimensional image data of the target object 91 and surface point group data of the target object 91.

Since the single imaging data is actually measured data, the single imaging data includes the shape data of the background in addition to the shape data of the target object 91. Therefore, in the present step, the shape data of the background is removed, and only the shape data of the target object 91 is extracted and used as the single imaging data. Since the background is the table 92 and the upper surface is a flat surface, it can be easily distinguished from the shape data of the target object 91.

1.2.8 Generation of Learning Data (Step S18)

Next, the learning data generation section 428 performs step S181 of replacing the shape data of the target object 91 included in the extracted outermost surface object data with the single imaging data acquired in step S17, in the first bulk data. Therefore, the shape data based on the synthesized image included in the extracted object data can be replaced with the single imaging data that is the actually measured data. At the same time, the position/posture information included in the object data can be associated with the replaced single imaging data. In this way, one element of the learning data is obtained.

Next, in step S182, it is determined whether or not the shape data is replaced for all of the extracted object data. If the replacement is not completed, the disposition of the imaging section 3 in step S16, the acquisition of single imaging data in step S17, and the replacement of data in the present step are performed again for the remaining object data. If the replacement is completed, it is assumed that the learning data is generated.

Figure 6:
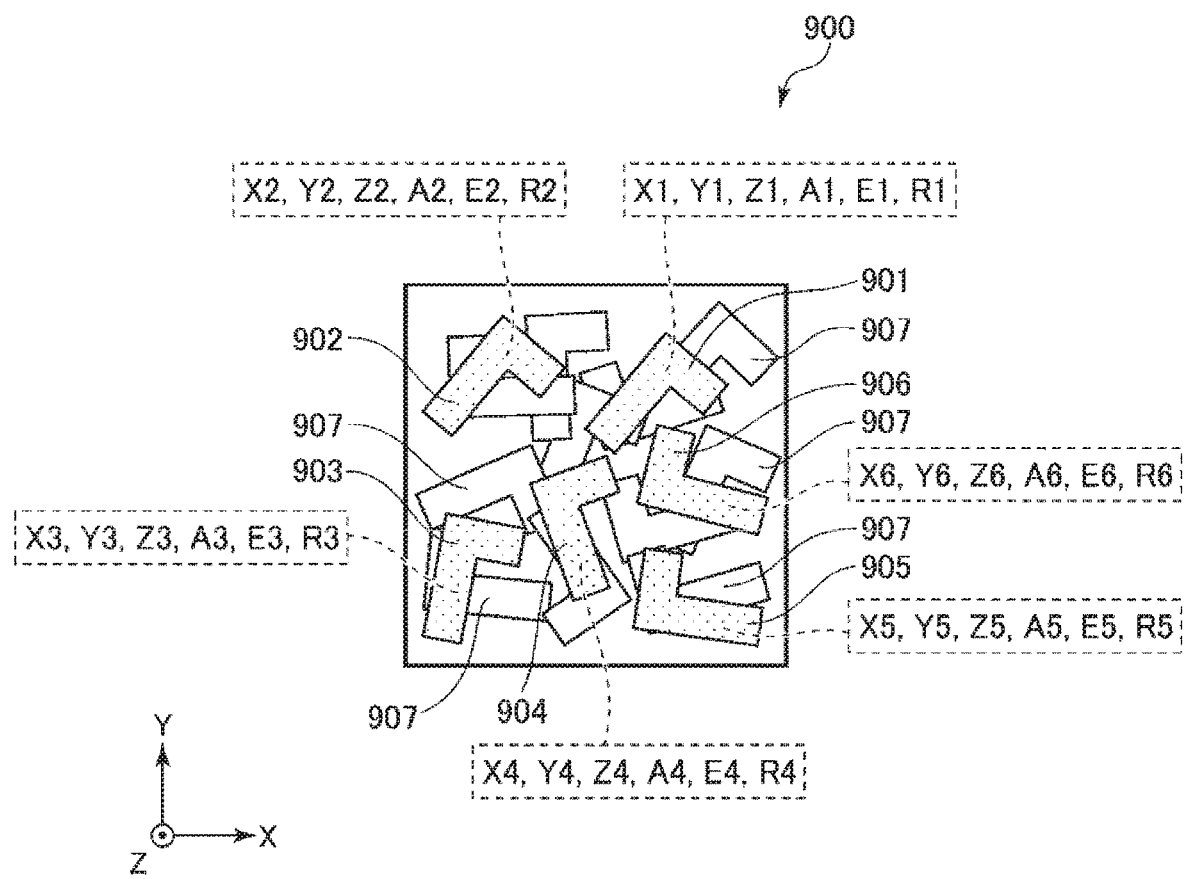
FIG. 6 is a conceptual view illustrating an example of learning data generated by an information processing method according to the first embodiment.
Figure 7:
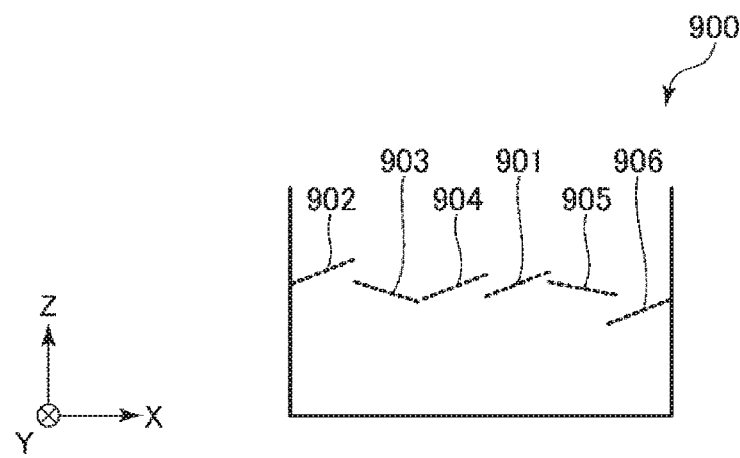
FIG. 7 is a conceptual view illustrating only surface point group data for outermost surface object data included in the learning data illustrated in FIG. 6.

FIG. 6 is a conceptual view illustrating an example of the learning data generated by the information processing method according to the first embodiment. In addition, FIG. 6 is a view seen from vertically above. FIG. 7 is a conceptual view illustrating only the surface point group data for the object data 901 to 906 of the outermost surface included in the learning data illustrated in FIG. 6. In addition, FIG. 7 is a view seen from a horizontal surface.

The learning data 900 illustrated in FIGS. 6 and 7 includes six pieces of object data 901, 902, 903, 904, 905, and 906 as the outermost surface object data. FIG. 6 also illustrates object data 907 of the background, which exists in the background of these object data 901 to 906. The learning data 900 is data in which these object data 901 to 907 are stacked almost randomly. The object data 901 to 906 located on the outermost surface are marked with dots.

FIG. 6 also illustrates images of position/posture information included in the object data 901 to 906. Specifically, the object data 901 includes position/posture information (X1, Y1, Z1, A1, E1, and R1). For example, X1 is position information along the X-axis, Y1 is position information along the Y-axis, Z1 is position information along the Z-axis, A1 is posture information about the azimuth angle, and E1 is posture information about the elevation angle, and R1 is posture information about the rotation angle. Similarly, the object data 902 includes position/posture information (X2, Y2, Z2, A2, E2, and R2), and the object data 903 to 906 also respectively include position/posture information (X3, Y3, Z3, A3, E3, and R3), (X4, Y4, Z4, A4, E4, and R4), (X5, Y5, Z5, A5, E5, and R5), and (X6, Y6, Z6, A6, E6, and R6).

Further, FIG. 7 illustrates images of surface point group data included in the object data 901 to 906.

By generating the learning data 900 including a large number of data such as the object data 901 to 907, a scale of the learning data can be increased, and the detection accuracy of the target object 91 in the object detection apparatus 4 can be further increased.

The learning data 900 may include object data having the same position/posture. For example, when the illumination condition is changed, the single imaging data also changes. Therefore, individual learning data may be generated by using the single imaging data of the same position/posture acquired under different illumination conditions.

Further, when the single imaging data is imaged in step S17, a plurality of target objects 91 having the same position/posture are disposed in a same field of view of the imaging section 3, and each time the single imaging data is acquired, the target object 91 of the imaging target may be randomly changed. Therefore, the single imaging data from which the influence of the environmental light reflected in the target object 91 differs can be acquired. Therefore, the learning data 900 in which such influence is also taken into consideration can be generated. As a result, the detection accuracy of the target object 91 in the object detection apparatus 4 can be further increased.

As described above, the information processing method according to the present embodiment is a method for generating the learning data for detecting the position/posture of the target object 91 (object), including step S11 of receiving the design data of the target object 91; step S13 of generating the object data including the shape data of the target object 91 and the position/posture information of the target object 91 from the design data; step S14 of generating the first bulk data by stacking a plurality of object data by simulation; step S15 of extracting the object data disposed on the outermost surface as the outermost surface object data, in the first bulk data; step S16 of disposing the imaging section 3 based on the imaging angle and the imaging distance at which the position/posture of the outermost surface object data can be obtained, when the imaging section 3 images the target object 91 placed alone; step S17 of acquiring the single imaging data (first imaging data) by imaging the target object 91 placed alone by the imaging section 3 from the imaging angle and the imaging distance; and step S18 of generating the learning data by replacing the shape data included in the outermost surface object data with single imaging data, in the first bulk data.

According to such an information processing method, the first bulk data is generated by simulation, and the learning data is generated based on the first bulk data. Therefore, the learning data of the target object 91 in the bulk state can be efficiently generated in a short time. In addition, by replacing the data, the actually measured data can be used as the shape data of the target object 91. Therefore, the learning data suitable for the actual environment can be generated. That is, while the learning data can be efficiently generated by simulation, a gap between the simulation result and the actual environment can be reduced. As a result, it is possible to efficiently generate the learning data reflecting noise and data loss in the actual environment. As a result, when the target object 91 is detected by using the learning data, a detection rate can be improved, so that the efficiency of the operation on the target object 91 by the robot 1 can be increased.

In addition, the information processing device 42 according to the present embodiment is a device for generating the learning data for detecting the position/posture of the target object 91 (object), including: the design data receiving section 421 that receives design data of the target object 91; the object data generation section 422 that generates the object data including the shape data of the target object 91 and the position/posture information of the target object 91 from the design data; the first bulk data generation section 423 that generates the first bulk data by stacking a plurality of object data by simulation; the outermost surface extraction section 424 that extracts the object data disposed on the outermost surface as outermost surface the object data, in the first bulk data; the imaging angle calculation section 426 that calculates the imaging angle and the imaging distance corresponding to the outermost surface object data when the imaging section 3 images the target object 91 placed alone; the single imaging data acquisition section 427 (first imaging data acquisition section) that acquires the single imaging data (first imaging data) by imaging the target object 91 placed alone by the imaging section 3 at the imaging angle and the imaging distance; and the learning data generation section 428 that generates the learning data by replacing the shape data included in the outermost surface object data with the single imaging data, in the first bulk data.

According to such an information processing device 42, the first bulk data is generated by simulation, and the learning data is generated based on the first bulk data. Therefore, the learning data of the target object 91 in the bulk state can be efficiently generated. Therefore, it is possible to reduce a load on the information processing device 42 when large-scale learning data is generated. In addition, by replacing the data, the actually measured data can be used as the shape data of the target object 91. Therefore, the learning data suitable for the actual environment can be generated.

Furthermore, the object detection apparatus 4 according to the present embodiment is an apparatus that detects the position/posture of the target object 91 (object), including: the information processing device 42; the bulk imaging data acquisition section 44 (second imaging data acquisition section) that acquires the bulk imaging data (second imaging data) by imaging the target object 91 by the imaging section 3; and the object position/posture detection section 46 that detects the position/posture of the target object 91 based on the bulk imaging data and the learning data.

According to such an object detection apparatus 4, the learning data can be efficiently generated in the information processing device 42, so that the load on the object detection apparatus 4 can be reduced. Moreover, since the learning data suitable for the actual environment can be generated in the information processing device 42, when the target object 91 is detected by using the learning data, the detection rate can be improved. As a result, even when the target objects 91 are stacked in bulk, for example, the target object 91 can be accurately held by the end effector 17 of the robot 1.

In addition, the robot system 100 according to the present embodiment includes the robot 1 including the robot arm 10, the imaging section 3 installed in the robot arm 10, the object detection apparatus 4, and the robot control device 5 for controlling the driving of the robot 1 based on the detection result of the object detection apparatus 4.

According to such a robot system 100, since the learning data for detecting the position/posture of the target object 91 can be efficiently generated, operation efficiency can be improved.

2. Second Embodiment 2.1 Information Processing Device

Next, an information processing device according to a second embodiment will be described.

Figure 8:
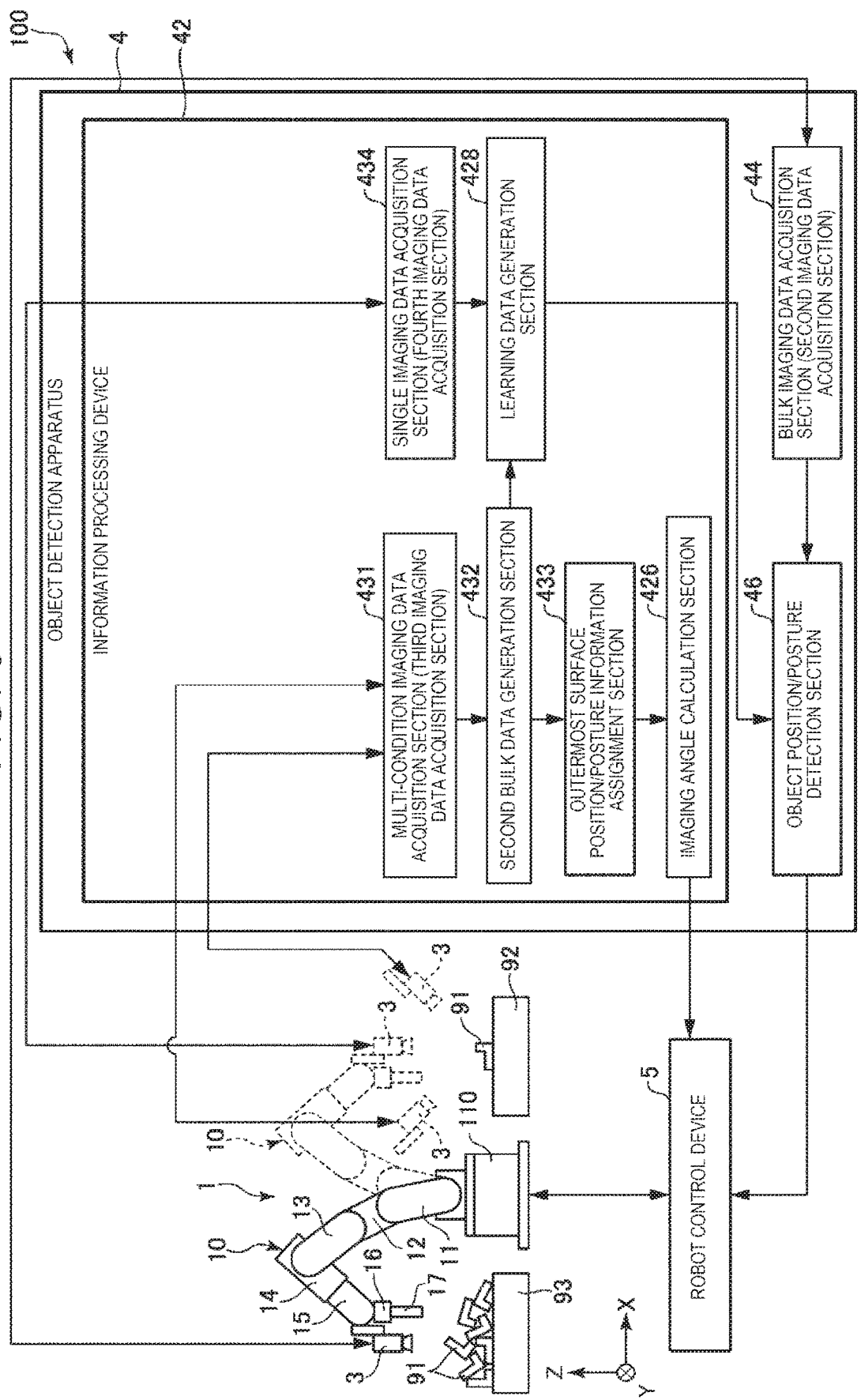
FIG. 8 is a functional block diagram illustrating a robot system including an information processing device according to a second embodiment.

FIG. 8 is a functional block diagram illustrating a robot system including the information processing device according to the second embodiment.

Hereinafter, the information processing device according to the second embodiment will be described, but in the following description, differences from the information processing device according to the first embodiment will be mainly described, and description of similar matters will be omitted. In FIG. 8, the same components as those in the first embodiment are denoted by the same reference numerals.

An information processing device 42 according to the second embodiment is the same as the information processing device 42 according to the first embodiment except that learning data is generated not by using design data of a target object 91 but by using multi-condition imaging data (third imaging data) obtained by imaging a target object 91 under a plurality of different imaging conditions. That is, the present embodiment is different from the first embodiment in that it can be applied even when there is no three-dimensional CAD data or the like for the target object 91.

The information processing device 42 illustrated in FIG. 8 includes a multi-condition imaging data acquisition section 431 (third imaging data acquisition section), a second bulk data generation section 432, an outermost surface position/posture information assignment section 433, an imaging angle calculation section 426, a single imaging data acquisition section 434 (fourth imaging data acquisition section), and a learning data generation section 428.

The multi-condition imaging data acquisition section 431 is coupled to the imaging section 3, and causes the imaging section 3 to image the target object 91 that is placed alone on the table 92. In this case, the target object 91 is imaged under a plurality of imaging conditions. Therefore, a plurality of multi-condition imaging data (third imaging data) are acquired. The multi-condition imaging data is shape data obtained by imaging one target object 91 under a plurality of different imaging conditions. Therefore, the shape data of the target object 91 is generated. The imaging conditions include an imaging angle and an imaging distance with respect to the target object 91, an illumination condition at the time of imaging, and the like.

The second bulk data generation section 432 generates second bulk data by stacking the multi-condition imaging data by simulation. Specifically, the position/posture of the target object 91 when in a bulk state is simulated by stacking multi-condition imaging data. In the present embodiment, the bulk state is simulated by randomly disposing the multi-condition imaging data.

The outermost surface position/posture information assignment section 433 assigns the position/posture information to the multi-condition imaging data disposed on the outermost surface, in the second bulk data. The multi-condition imaging data on the outermost surface refers to the multi-condition imaging data in which, for example, the Z coordinate indicates a larger value than the surroundings, in the second bulk data. Further, the position/posture information assigned to the multi-condition imaging data is information including, for example, the position of the adsorption surface that can be adsorbed by the end effector 17 in the target object 91 and the direction of the normal line of the adsorption surface. The outermost surface position/posture information assignment section 433 extracts such position/posture information from the multi-condition imaging data, and assigns the position/posture information as correct answer data. Therefore, even if there is no design data, the correct answer data for generating the learning data that can be used when the end effector 17 holds the target object 91 can be assigned.

The imaging angle calculation section 426 calculates the imaging angle and the imaging distance corresponding to the multi-condition imaging data on the outermost surface, when the imaging section 3 images the target object 91 placed alone on the table 92.

The single imaging data acquisition section 434 (fourth imaging data acquisition section) causes the imaging section 3 to image the target object 91 placed alone on the table 92 at the imaging angle and the imaging distance calculated by the imaging angle calculation section 426. Therefore, the single imaging data (fourth imaging data) is acquired.

The learning data generation section 428 replaces the shape data of the target object 91 included in the multi-condition imaging data to which the position/posture information is assigned with single imaging data that is actually measured data, in the second bulk data. Therefore, the learning data including the single imaging data that is the actually measured data of the target object 91 and the position/posture information of the target object 91 is generated.

The configuration of the information processing device 42 according to the second embodiment is described above. Next, an operation of the information processing device 42, that is, an information processing method will be described.

2.2 Information Processing Method

Next, an information processing method according to the second embodiment will be described.

Figure 9:
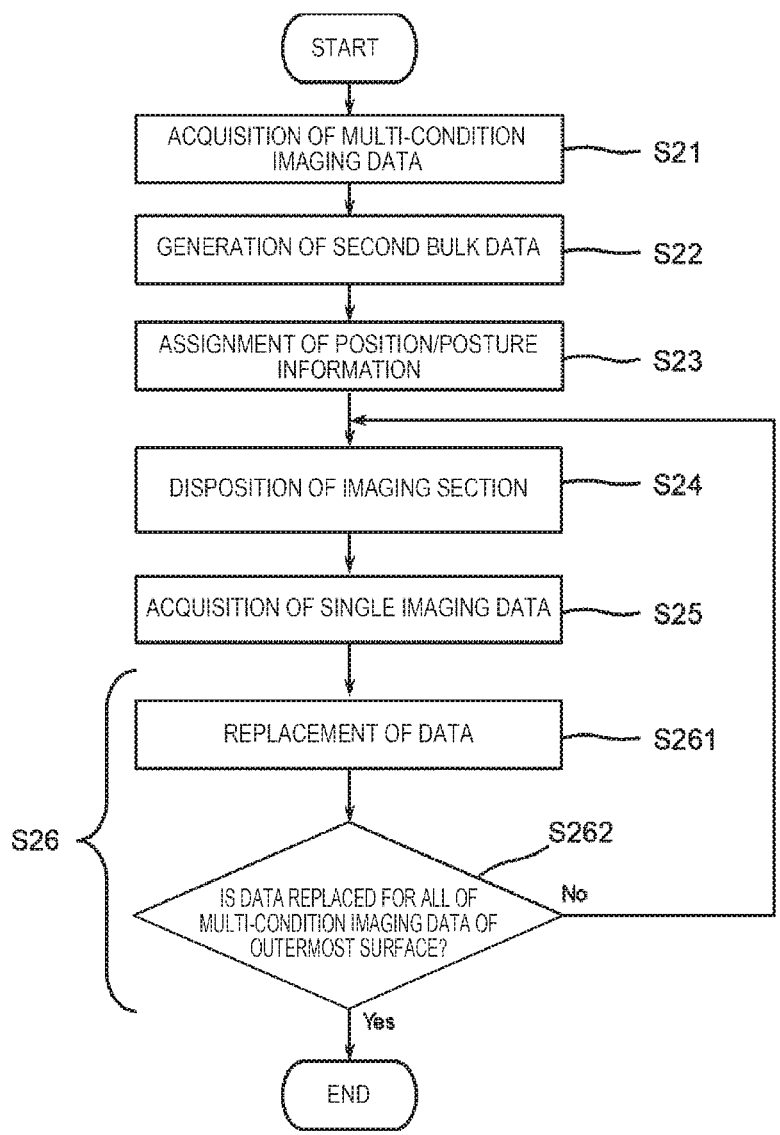
FIG. 9 is a flowchart illustrating an information processing method according to the second embodiment.

FIG. 9 is a flowchart illustrating the information processing method according to the second embodiment.

Hereinafter, the information processing method according to the second embodiment will be described, but in the following description, differences from the information processing method according to the first embodiment will be mainly described, and description of similar matters will be omitted. In FIG. 9, the same components as those in the embodiment described above are denoted by the same reference numerals.

The information processing method according to the second embodiment is the same as the information processing method according to the first embodiment except that learning data is generated not by using design data of a target object 91 but by using multi-condition imaging data (third imaging data) obtained by imaging a target object 91 under a plurality of different imaging conditions.

The information processing method illustrated in FIG. 9 includes: step S21 of acquiring multi-condition imaging data (third imaging data); step S22 of generating second bulk data by stacking the multi-condition imaging data; step S23 of assigning position/posture information to the multi-condition imaging data on the outermost surface; step S24 of calculating the imaging angle of the imaging section 3 based on the multi-condition imaging data on the outermost surface, and disposing the imaging section 3 to be the imaging angle; step S25 of acquiring single imaging data (fourth imaging data) by the imaging section 3; and step S26 of generating learning data based on the multi-condition imaging data and the single imaging data. Hereinafter, each step will be sequentially described.

2.2.1 Acquisition of Multi-Condition Imaging Data (Step S21)

First, the target object 91 is placed alone on the table 92. Next, the target object 91 is imaged under a plurality of different imaging conditions. The multi-condition imaging data acquisition section 431 acquires a plurality of multi-condition imaging data (third imaging data). In the following description, the target object 91 is imaged under two imaging conditions in order to simplify the description.

Figure 10:
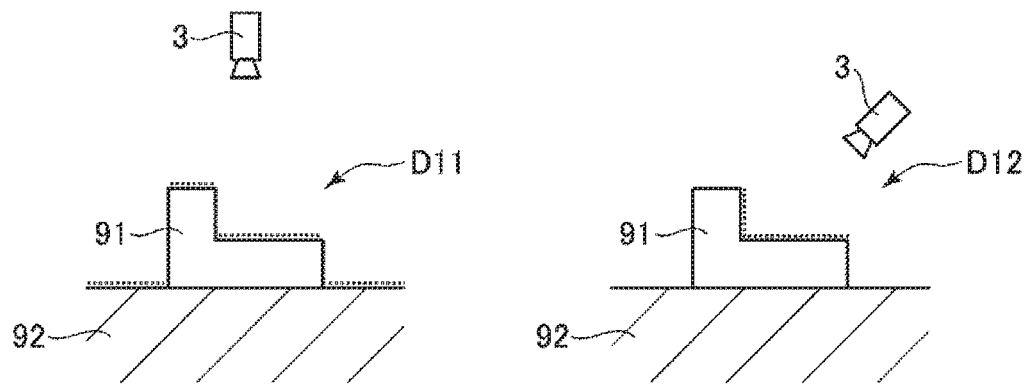
FIG. 10 is a side view for explaining a state in which a target object is imaged under a first imaging condition and a second imaging condition different from each other.

FIG. 10 is a side view for explaining a state in which the target object 91 is imaged under a first imaging condition and a second imaging condition different from each other. In FIG. 10, an outline of the target object 91 and an upper surface of a table 92 are indicated by solid lines. In addition, a surface from which surface point group data is obtained by imaging under each imaging condition is indicated by broken lines.

The first imaging condition and the second imaging condition illustrated in FIG. 10 are different in the imaging angle with respect to the target object 91. In FIG. 10, multi-condition imaging data obtained under the first imaging condition is D11, and multi-condition imaging data obtained under the second imaging condition is D12. The multi-condition imaging data D11 and the multi-condition imaging data D12 are different from each other.

Figure 11:
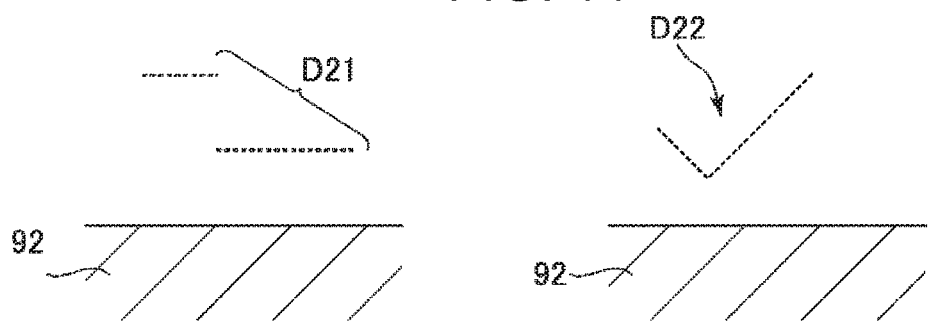
FIG. 11 is a view obtained by extracting surface point group data corresponding to a target object by removing a background portion in multi-condition imaging data illustrated in FIG. 10.

FIG. 11 is a view in which the surface point group data D21 and D22 corresponding to the target object 91 are extracted by removing a background portion from the multi-condition imaging data D11 and D12 illustrated in FIG. 10. In FIG. 10, since the background of the target object 91 is the table 92, the background portion can be easily identified based on contents of the surface point group data D21 and D22. Therefore, the surface point group data D21 and D22 corresponding to the target object 91 as illustrated in FIG. 11 can be extracted by removing the background portion from the multi-condition imaging data D11 and D12 illustrated in FIG. 10.

In the surface point group data D21 and D22 in FIG. 11, the surface point group data D22 obtained under the second imaging condition is data obtained by translating and rotating the surface point group data D12 illustrated in FIG. 10. As described above, the imaging angle when acquiring the multi-condition imaging data D11 is different from the imaging angle when acquiring the multi-condition imaging data D12, and accordingly, as illustrated in FIG. 11, the surface point group data D22 is translated and rotated. Therefore, the surface point group data D22 illustrated in FIG. 11 is obtained.

As described above, by imaging the target object 91 under different imaging conditions from each other, the multi-condition imaging data D11 and D12 having different positions/postures from each other can be acquired. That is, the multi-condition imaging data D11 and D12 including the surface point group data D21 and D22 corresponding to various positions/postures of the target object 91 can be acquired. In this way, a large number of multi-condition imaging data are acquired.

Subsequently, a part of the multi-condition imaging data D11 and D12 is lost. Therefore, in the second bulk data to be described later, it is possible to simulate data located in the background portion of the data located on the outermost surface.

Figure 12:
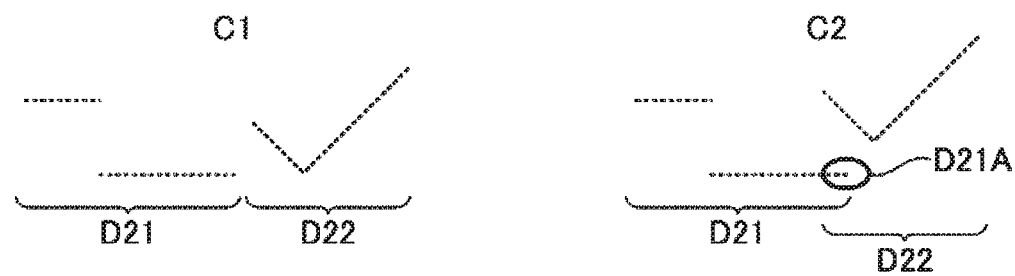
FIG. 12 is a view illustrating an example in which the two surface point group data illustrated in FIG. 11 are disposed without overlapping each other, and an example in which the two surface point group data are disposed so as to partially overlap each other.

FIG. 12 is a view illustrating an example C1 in which the two surface point group data D21 and D22 illustrated in FIG. 11 are disposed without overlapping each other, and an example C2 in which the two surface point group data D21 and D22 are disposed so as to partially overlap each other. In Example C1, no overlap occurs, but in Example C2, an overlap occurs, and a part D21A of the surface point group data D21 is hidden behind the surface point group data D22. Therefore, it is possible to simulate data located in the background portion by losing a part of the multi-condition imaging data D11 and D12.

2.2.2 Generation of Second Bulk Data (Step S22)

Next, the second bulk data generation section 432 generates the second bulk data by staking the multi-condition imaging data by simulation. Specifically, the position/posture of the target object 91 when in a bulk state is simulated by stacking multi-condition imaging data. In the present embodiment, the bulk state is simulated by randomly disposing multi-condition imaging data on a plane.

First, the background portion of the second bulk data is generated by randomly disposing the multi-condition imaging data D11 and D12 which are partially lost. In addition, a loss position and a loss shape may be arbitrarily set.

Next, in the background portion, a position that is higher than the surroundings is determined. This determination may be arbitrarily performed. Then, the multi-condition imaging data D11 and D12 are randomly disposed at the position. Therefore, the outermost surface portion of the second bulk data is generated. That is, the multi-condition imaging data D11 and D12 are disposed so as to be stacked in multiple layers on the plane, and the second bulk data is generated. For example, if it is assumed that three layers overlap as a whole, a first layer and a second layer close to the plane are the background portion, and a third layer is the outermost surface portion.

As described above, step S22 of generating the second bulk data according to the present embodiment includes a process of making loss imaging data obtained by losing a part of the shape data of the multi-condition imaging data (third imaging data) be converted into data disposed in a region other than the outermost surface portion of the second bulk data, that is, in the background of the outermost surface portion. Therefore, the background portion of the second bulk data can be efficiently generated.

In addition, step S22 of generating the second bulk data according to the present embodiment includes a process of making the multi-condition imaging data that is not lost, that is, the multi-condition imaging data (third imaging data) without the occlusion be converted into multi-condition imaging data disposed on the outermost surface portion of the second bulk data, that is, on the outermost surface. Therefore, the outermost surface portion of the second bulk data can be efficiently generated.

2.2.3 Assignment of Position/Posture Information (Step S23)

Next, the outermost surface position/posture information assignment section 433 assigns the position/posture information to the outermost surface portion of the second bulk data. Unlike the first embodiment, the second bulk data according to the present embodiment does not have the position/posture information based on the design data. Therefore, the position/posture information is assigned in the present step. The position/posture information has various forms depending on a method of using the learning data. As an example, when the learning data used for the operation of adsorbing the target object 91 by the adsorption-type end effector 17 is generated, information including an adsorption point for adsorbing the target object 91 and a normal line of the adsorption point is assigned as the position/posture information. Specifically, for example, the center positions of the multi-condition imaging data D11 and D12 may be set as adsorption points, and the position of the adsorption point and the normal direction thereof may be used as the position/posture information. The adsorption point is not limited to the center position, and may be a position other than that.

2.2.4 Disposition of Imaging Section (Step S24)

Next, the imaging angle calculation section 426 calculates the imaging angle and the imaging distance of the imaging section 3 corresponding to the multi-condition imaging data based on the multi-condition imaging data located on the outermost surface of the second bulk data. The present step is the same as step S16 according to the first embodiment.

2.2.5 Acquisition of Single Imaging Data (Step S25)

Next, based on a control signal from the single imaging data acquisition section 434 (fourth imaging data acquisition section), the imaging section 3 images the target object 91 placed alone on the table 92. The single imaging data acquisition section 434 acquires the single imaging data (fourth imaging data). The single imaging data is actually measured data including two-dimensional image data of the target object 91 and surface point group data of the target object 91. The present step is the same as step S17 according to the first embodiment.

2.2.6 Generation of Learning Data (Step S26)

Next, the learning data generation section 428 performs step S261 of replacing the shape data of the target object 91 included in the multi-condition imaging data located on the outermost surface with the single imaging data acquired in step S25, in the second bulk data. Therefore, in the multi-condition imaging data on the outermost surface, the single imaging data that is the actually measured data can be associated with the position/posture information of the target object 91 included in the multi-condition imaging data.

Next, as step S262, it is determined whether or not the shape data is replaced for all of the multi-condition imaging data of the outermost surface. If the replacement is not completed, the disposition of the imaging section 3 in step S24, the acquisition of single imaging data in step S25, and the replacement of data in the present step are performed again for the remaining multi-condition imaging data. If the replacement is completed, it is assumed that the learning data is generated.

As described above, the information processing method according to the present embodiment is a method for generating the learning data for detecting the position/posture of the target object 91 (object), including: step S21 of acquiring a plurality of multi-condition imaging data (third imaging data) including the shape data of the target object 91 by imaging the target object 91 placed alone by the imaging section 3 under a plurality of different imaging conditions; step S22 of generating the second bulk data by stacking the multi-condition imaging data by simulation; step S23 of assigning the position/posture information to the multi-condition imaging data disposed on the outermost surface of the second bulk data; step S24 of disposing the imaging section 3 based on the imaging angle and the imaging distance at which the position/posture of the multi-condition imaging data (third imaging data) disposed on the outermost surface is obtained when the imaging section 3 images the target object 91 placed alone; step S25 of acquiring the single imaging data (fourth imaging data) by imaging the target object 91 placed alone by the imaging section 3 from the imaging angle and the imaging distance; and step S26 of generating the learning data by replacing the shape data included in the multi-condition imaging data to which the position/posture information is assigned, with the single imaging data, in the second bulk data.

According to such an information processing method, the second bulk data is generated by simulation, and the learning data is generated based on the second bulk data. Therefore, the learning data of the target object 91 in the bulk state can be efficiently generated in a short time. In addition, by replacing the data, the actually measured data can be used as the shape data of the target object 91. Therefore, the learning data suitable for the actual environment can be generated. As a result, when the target object 91 is detected by using learning data, the detection rate can be improved.

In addition, since it is not necessary to prepare the design data as in the first embodiment, the learning data can be generated even when an operation is performed on an unknown target object 91.

In addition, the information processing device 42 according to the present embodiment includes the multi-condition imaging data acquisition section 431 (third imaging data acquisition section) that acquires a plurality of multi-condition imaging data (third imaging data) including the shape data of the target object 91 by imaging the target object 91 (object) placed alone by the imaging section 3 under a plurality of different imaging conditions; the second bulk data generation section 432 that generates the second bulk data by stacking the multi-condition imaging data by simulation; the outermost surface position/posture information assignment section 433 that assigns the position/posture information to the multi-condition imaging data disposed on the outermost surface, in the second bulk data; the imaging angle calculation section 426 that calculates the imaging angle and the imaging distance corresponding to the multi-condition imaging data to which the position/posture information is assigned, when the imaging section 3 images the target object 91 placed alone; the single imaging data acquisition section 434 (fourth imaging data acquisition section) that acquires the single imaging data (fourth imaging data) by imaging the target object 91 placed alone by the imaging section 3 at the imaging angle and the imaging distance; and the learning data generation section 428 that generates the learning data by replacing the shape data included in the multi-condition imaging data to which the position/posture information is assigned with the single imaging data, in the second bulk data.

According to such an information processing device 42, the second bulk data is generated by simulation and the learning data is generated based on the second bulk data. Therefore, the learning data of the target object 91 in the bulk state can be efficiently obtained in a short time. In addition, by replacing the data, the actually measured data can be used as the shape data of the target object 91. Therefore, the learning data suitable for the actual environment can be generated.

In addition, since it is not necessary to prepare the design data as in the first embodiment, the learning data can be generated even when an operation is performed on an unknown target object 91.

3. Third Embodiment 3.1 Information Processing Device

Next, an information processing device according to a third embodiment will be described.

Figure 13:
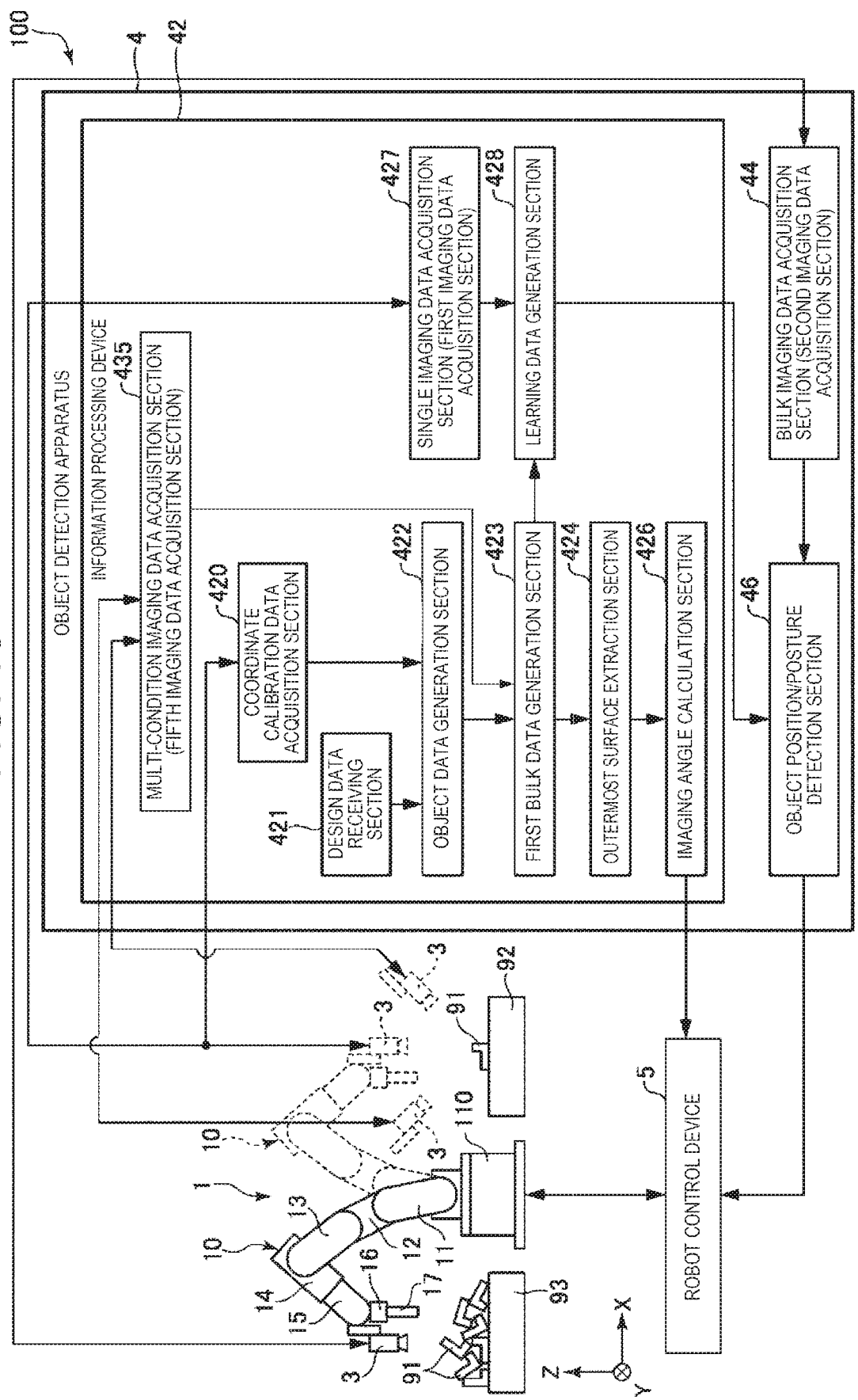
FIG. 13 is a functional block diagram illustrating a robot system including an information processing device according to a third embodiment.

FIG. 13 is a functional block diagram illustrating a robot system including the information processing device according to the third embodiment.

Hereinafter, the information processing device according to the third embodiment will be described, but in the following description, differences from the information processing device according to the first and second embodiments will be mainly described, and description of similar matters will be omitted. In FIG. 13, the same components as those in the embodiments described above are denoted by the same reference numerals.

An information processing device 42 according to the third embodiment is obtained by combining the first embodiment and the second embodiment. Specifically, the information processing device according to the present embodiment is the same as the information processing device 42 according to the embodiments described above except that the object data of the target object 91 is used and learning data is generated by using fifth imaging data obtained by imaging the target object 91 under a plurality of different imaging conditions.

That is, the information processing device 42 according to the third embodiment is different from those of the first and second embodiments in that data obtained by associating the object data according to the first embodiment with the multi-condition imaging data (fifth imaging data) similar to the second embodiment is used, when the first bulk data according to the first embodiment is generated.

Specifically, the information processing device 42 illustrated in FIG. 13 further includes a multi-condition imaging data acquisition section 435 (fifth imaging data acquisition section) in addition to the information processing device 42 illustrated in FIG. 1.

The first bulk data generation section 423 generates the first bulk data by stacking the multi-condition imaging data associated with the object data generated from the design data.

In this way, the first bulk data is generated by using the multi-condition imaging data associated with the object data, so that the operation such as data loss performed in step S22 of the second embodiment is not necessary for the background portion of the first bulk data. Therefore, the data of the background portion can be generated in a relatively short time, and the learning data can be generated in a shorter time.

3.2 Information Processing Method

Next, an information processing method according to the third embodiment will be described.

Figure 14:
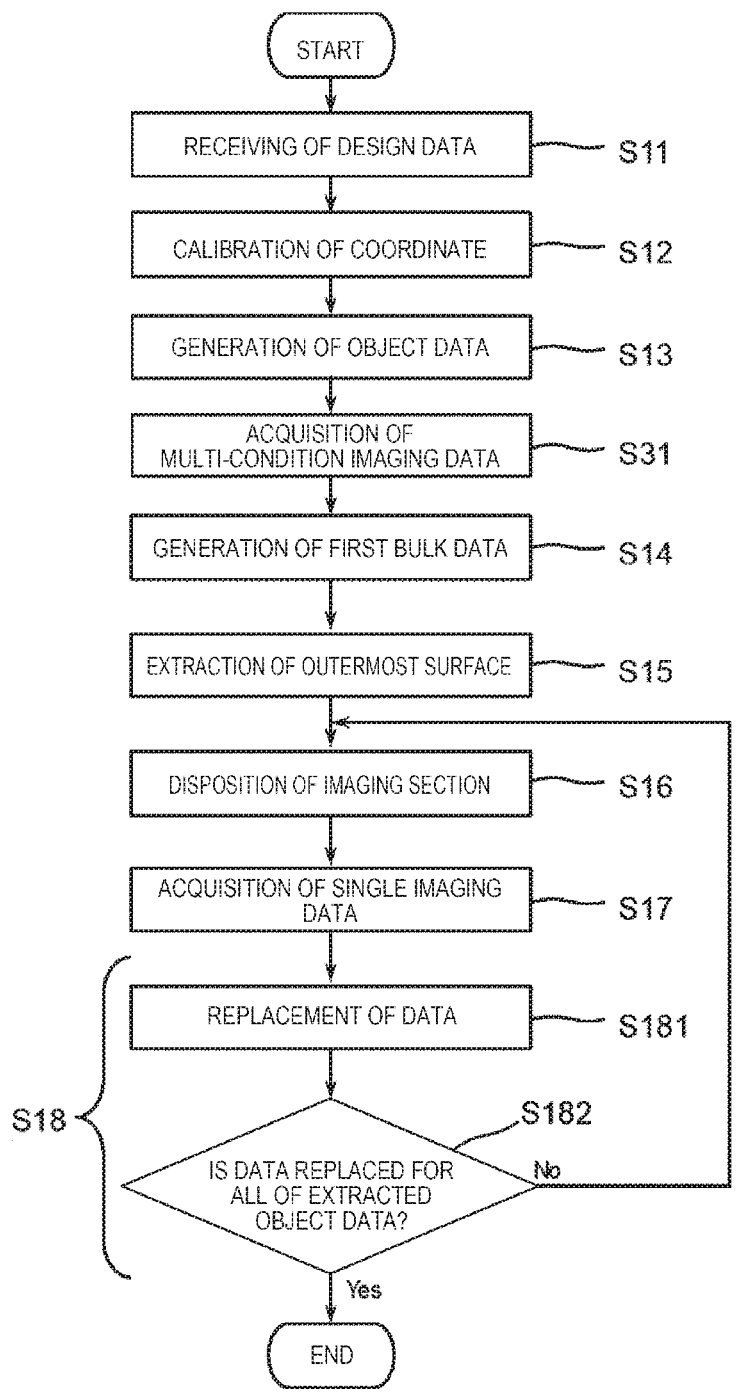
FIG. 14 is a flowchart illustrating an information processing method according to the third embodiment.

FIG. 14 is a flowchart illustrating the information processing method according to the third embodiment.

Hereinafter, the information processing method according to the third embodiment will be described, but in the following description, differences from the information processing method according to the first and second embodiments will be mainly described, and description of similar matters will be omitted. In FIG. 14, the same components as those in the embodiments described above are denoted by the same reference numerals.

The information processing method according to the third embodiment is different from those of the first and second embodiments in that data obtained by associating the design data according to the first embodiment with the multi-condition imaging data (third imaging data) according to the second embodiment is used, when the first bulk data according to the first embodiment is generated.

The information processing method illustrated in FIG. 14 includes step S11 of receiving the design data of the target object 91; step S12 of performing calibration of coordinate; step S13 of generating the object data including the shape data of the target object 91 and the position/posture information of the target object 91 from the design data; step S31 of acquiring a plurality of the multi-condition imaging data (fifth imaging) including the shape data of the target object 91 by imaging the target object 91 placed alone by the imaging section 3 under a plurality of imaging conditions; step S14 of generating the first bulk data by stacking the multi-condition imaging data by simulation, after the object data is associated with the multi-condition imaging data; step S15 of extracting the object data (outermost surface object data) disposed on the outermost surface, in the first bulk data; step S16 of disposing the imaging section 3 based on the imaging angle and the imaging distance corresponding to the extracted object data, when the imaging section 3 images the target object 91 placed alone; step S17 of acquiring the single imaging data (first imaging data) by imaging the target object 91 placed alone by the imaging section 3 from the imaging angle and the imaging distance; and step S18 of generating the learning data by replacing the shape data included in the extracted object data with the single imaging data, in the first bulk data.

That is, in the information processing method according to the present embodiment, step S21 of acquiring the plurality of multi-condition imaging data (fifth imaging data) including the shape data of the target object 91 by imaging the target object 91 placed alone by the imaging section 3 under the plurality of imaging conditions is further added to the information processing method according to the first embodiment. Step S14 of generating the first bulk data is a step of obtaining the first bulk data by associating the object data generated from the design data with the multi-condition imaging data, and stacking the multi-condition imaging data associated with the object data.

In this way, the first bulk data is generated by using the multi-condition imaging data associated with the object data, so that the operation such as data loss performed in step S22 of the second embodiment is not necessary for the background portion of the first bulk data. Therefore, the data of the background portion can be generated in a relatively short time, and the learning data can be generated in a shorter time.

4. Fourth Embodiment 4.1 Information Processing Device

Next, an information processing device according to a fourth embodiment will be described.

Figure 15:
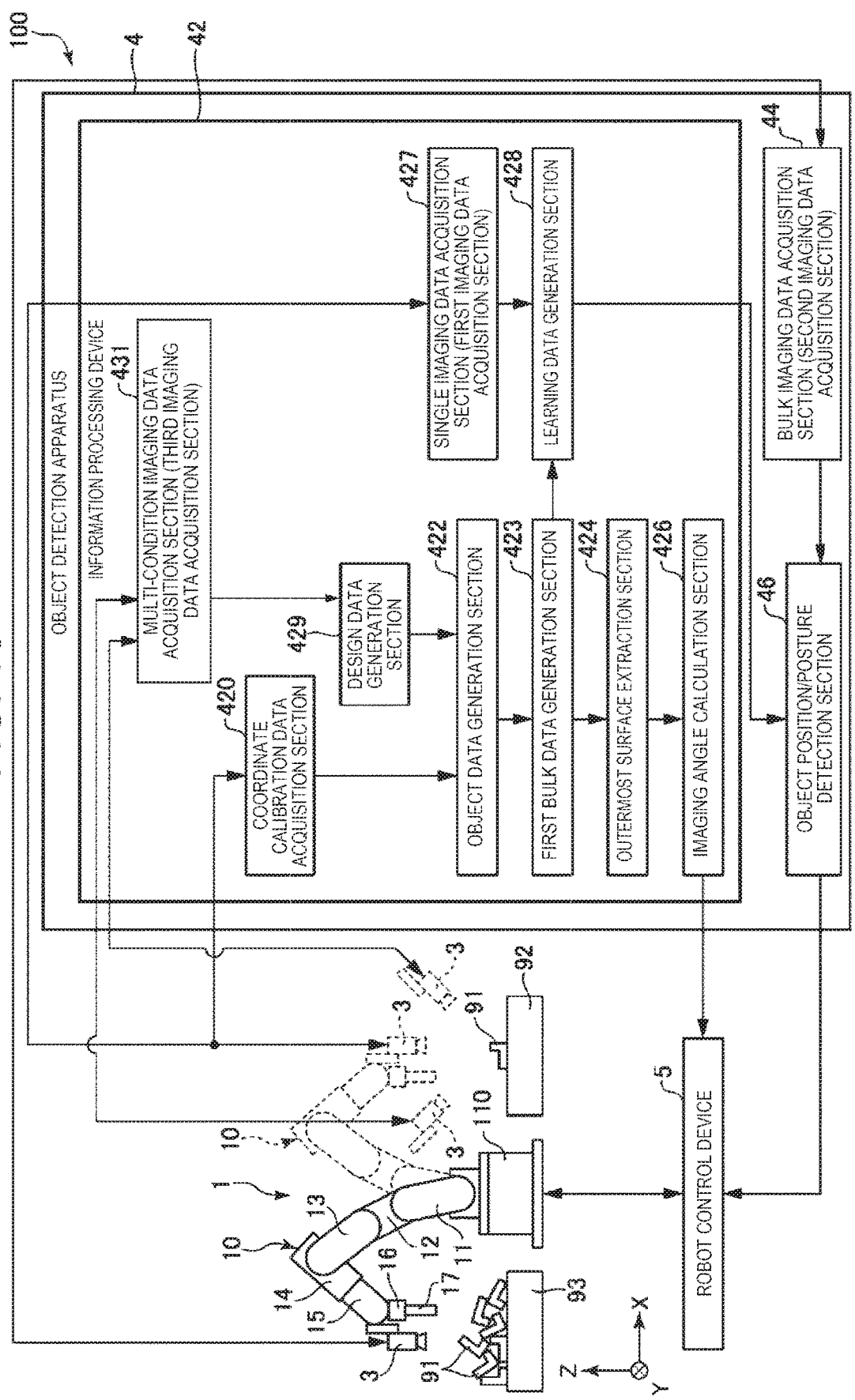
FIG. 15 is a functional block diagram illustrating a robot system including an information processing device according to a fourth embodiment.

FIG. 15 is a functional block diagram illustrating a robot system including the information processing device according to the fourth embodiment.

Hereinafter, the information processing device according to the fourth embodiment will be described, but in the following description, differences from the information processing device according to the first to third embodiments will be mainly described, and description of similar matters will be omitted. In FIG. 15, the same components as those in the embodiments described above are denoted by the same reference numerals.

The information processing device 42 according to the fourth embodiment is the same as that of the first embodiment except that the design data is generated from the multi-condition imaging data (third imaging data) according to the second embodiment and the design data is used. That is, the present embodiment is the same as the first embodiment except that a design data generation section 429 instead of the design data receiving section 421 is provided, and also a multi-condition imaging data acquisition section 431 (third imaging data acquisition section) is provided.

The multi-condition imaging data acquisition section 431 illustrated in FIG. 15 acquires the multi-condition imaging data and outputs the multi-condition imaging data to the design data generation section 429. The design data generation section 429 generates the design data from the multi-condition imaging data. That is, the surface point group data included in the multi-condition imaging data is converted into the design data such as the data of the three-dimensional CAD. A known conversion technique can be used to convert the surface point group data into the design data. For example, after generating mesh data or polygon data from the surface point group data, surface data or solid data may be generated from the mesh data, and finally, the design data may be generated.

According to such an information processing device 42, even when the design data of the target object 91 cannot be obtained, the design data of the target object 91 can be generated. Therefore, the position/posture information based on the design data can be assigned even for the unknown target object 91, and for example, the learning data of the target object 91 having a high detection rate can be efficiently generated.

4.2 Information Processing Method

Next, an information processing method according to the fourth embodiment will be described.

FIG. 16 is a flowchart illustrating the information processing method according to the fourth embodiment.

Hereinafter, the information processing method according to the fourth embodiment will be described, but in the following description, differences from the information processing method according to the first to third embodiments will be mainly described, and description of similar matters will be omitted.

The information processing method according to the fourth embodiment is the same as that of the first embodiment except that generation (step S41) of the design data instead of receiving (step S11) of the design data is provided, and acquisition (step S21) of the multi-condition imaging data according to the second embodiment is provided.

In step S41 of generating the design data, the design data is generated based on the multi-condition imaging data acquired in step S21 of acquiring the multi-condition imaging data. The design data generation method is the same as that described in Section 4.1. Therefore, even when the design data of the target object 91 cannot be obtained, the design data of the target object 91 can be generated. After the present step, as illustrated in FIG. 16, steps can be carried out similarly to those of the first embodiment.

In the fourth embodiment as described above, the same effects as those in the first and second embodiments can be obtained.

The fourth embodiment may not be the same as the first embodiment, but may be the same as the third embodiment except for the differences described above.

The information processing method, the information processing device, the object detection apparatus, and the robot system according to the present disclosure are described based on the illustrated embodiments. However, the present disclosure is not limited to those, and the configuration of each portion can be replaced with any configuration having a similar function. In addition, any other component may be added to the present disclosure. Furthermore, although the robot system according to the embodiments described above is a system including a 6-axis vertical articulated robot, the number of axes of the vertical articulated robot may be 5 axes or less, or 7 axes or more. Further, a horizontal articulated robot may be used instead of the vertical articulated robot.

What is claimed is:

1. An information processing method for generating learning data for detecting a position/posture of an object, the method comprising:
   receiving design data of the object;
   generating object data including shape data of the object and position/posture information of the object from the design data;
   generating first bulk data by stacking the object data by simulation;
   extracting the object data disposed on an outermost surface as outermost surface object data in the first bulk data;
   disposing an imaging section based on an imaging angle and an imaging distance at which a position/posture of the outermost surface object data is obtained, when the object placed alone is imaged by the imaging section;
   acquiring first imaging data by imaging the object placed alone by the imaging section from the imaging angle and the imaging distance; and
   generating the learning data by replacing the shape data included in the outermost surface object data with the first imaging data, in the first bulk data.

2. The information processing method according to claim 1, wherein
   the design data is data of a three-dimensional CAD of the object.

3. The information processing method according to claim 1, further comprising:
   acquiring fifth imaging data including the shape data of the object by imaging the object placed alone by the imaging section under a plurality of imaging conditions, wherein
   the generating the first bulk data is obtaining the first bulk data by associating the object data with the fifth imaging data and stacking the fifth imaging data associated with the object data.

4. An information processing device for generating learning data for detecting a position/posture of an object, the apparatus comprising:
   a design data receiving section receiving design data of the object;
   an object data generation section generating object data that includes shape data of the object and position/posture information of the object from the design data;
   a first bulk data generation section generating first bulk data by stacking the object data by simulation;
   an outermost surface extraction section extracting the object data that is disposed on an outermost surface as outermost surface object data, in the first bulk data;
   an imaging angle calculation section calculating an imaging angle and an imaging distance corresponding to the outermost surface object data, when the object placed alone is imaged by an imaging section;
   a first imaging data acquisition section acquiring first imaging data by imaging the object placed alone by the imaging section at the imaging angle and the imaging distance; and
   a learning data generation section generating learning data by replacing the shape data included in the outermost surface object data with the first imaging data, in the first bulk data.

5. A robot system comprising:
   a robot including a robot arm;
   an imaging section installed in the robot arm;
   an object detection apparatus for detecting a position/posture of an object; and
   a robot control device controlling driving of the robot based on a detection result of the object detection apparatus, wherein
   the object detection apparatus includes:
      the information processing device according to claim 4;
      a second imaging data acquisition section acquiring second imaging data by imaging the object by an imaging section; and
      an object position/posture detection section detecting the position/posture of the object based on the second imaging data and the learning data.

* * * * *